United States Patent
Bybell et al.

(10) Patent No.: US 9,280,488 B2
(45) Date of Patent: Mar. 8, 2016

(54) ASYMMETRIC CO-EXISTENT ADDRESS TRANSLATION STRUCTURE FORMATS

(71) Applicant: INTERNATIONAL BUSINESS MACHINES CORPORATION, Armonk, NY (US)

(72) Inventors: Anthony J. Bybell, Cedar Park, TX (US); David D. Dukro, Morrisville, NC (US); Bradly G. Frey, Austin, TX (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/646,770

(22) Filed: Oct. 8, 2012

(65) Prior Publication Data
US 2014/0101359 A1    Apr. 10, 2014

(51) Int. Cl.
*G06F 12/10*    (2006.01)

(52) U.S. Cl.
CPC ........ *G06F 12/1027* (2013.01); *G06F 12/1009* (2013.01); *G06F 12/1036* (2013.01); *G06F 12/1018* (2013.01); *G06F 2212/151* (2013.01)

(58) Field of Classification Search
CPC ............ G06F 12/1009; G06F 12/1018; G06F 12/1027; G06F 12/009; G06F 12/10; G06F 12/109; G06F 12/00; G06F 12/08; G06F 12/02; G06F 9/45533; G06F 12/1036; G06F 9/45537; G06F 3/0664
USPC ....................... 711/6, 114, 133, 154, 165, 209
See application file for complete search history.

(56) References Cited

U.S. PATENT DOCUMENTS

| | | | |
|---|---|---|---|
| 4,456,954 A | 6/1984 | Bullions, III et al. | |
| 4,680,700 A | 7/1987 | Hester et al. | |
| 4,876,646 A | 10/1989 | Gotou et al. | |
| 5,226,168 A | 7/1993 | Kobayashi et al. | |
| 5,854,913 A | 12/1998 | Goetz et al. | |
| 6,393,544 B1 | 5/2002 | Bryg et al. | |

(Continued)

FOREIGN PATENT DOCUMENTS

| | | |
|---|---|---|
| EP | 690386 A1 | 1/1996 |
| EP | 1959348 A2 | 12/2007 |
| WO | 2012129729 A1 | 10/2012 |

OTHER PUBLICATIONS

Office Action for U.S. Appl. No. 13/789,148 dated Jun. 19, 2014, 16 pages.

(Continued)

*Primary Examiner* — Jared Rutz
*Assistant Examiner* — Jean Edouard
(74) *Attorney, Agent, or Firm* — William A. Kinnaman, Esq.; Matthew M. Hulihan, Esq.; Heslin Rothenberg Farley & Mesiti P.C.

(57) ABSTRACT

An address translation capability is provided in which translation structures of different types are used to translate memory addresses from one format to another format. Multiple translation structure formats (e.g., multiple page table formats, such as hash page tables and hierarchical page tables) are concurrently supported in a system configuration. This facilitates provision of guest access in virtualized operating systems, and/or the mixing of translation formats to better match the data access patterns being translated.

17 Claims, 15 Drawing Sheets

(56) References Cited

U.S. PATENT DOCUMENTS

| | | |
|---|---|---|
| 6,430,670 B1 | 8/2002 | Bryg et al. |
| 6,671,791 B1 | 12/2003 | McGrath |
| 6,895,491 B2 | 5/2005 | Kjos et al. |
| 7,089,377 B1* | 8/2006 | Chen .............. 711/147 |
| 7,111,145 B1 | 9/2006 | Chen et al. |
| 7,395,405 B2 | 7/2008 | Anderson et al. |
| 7,428,626 B2 | 9/2008 | Vega |
| 7,752,417 B2 | 7/2010 | Manczak et al. |
| 7,822,941 B2 | 10/2010 | Vick et al. |
| 7,827,381 B2 | 11/2010 | Manczak et al. |
| 8,078,827 B2 | 12/2011 | Uhlig et al. |
| 8,086,822 B2 | 12/2011 | Devine et al. |
| 8,103,851 B2 | 1/2012 | Greiner et al. |
| 8,127,098 B1 | 2/2012 | Klaiber et al. |
| 8,135,937 B2 | 3/2012 | Hall et al. |
| 8,225,071 B2 | 7/2012 | Chen et al. |
| 8,244,978 B2 | 8/2012 | Kegel et al. |
| 8,386,747 B2 | 2/2013 | Moyer et al. |
| 2004/0210588 A1 | 10/2004 | Simkins et al. |
| 2005/0193165 A1* | 9/2005 | Sakaguchi et al. ............. 711/113 |
| 2006/0064567 A1* | 3/2006 | Jacobson et al. .............. 711/207 |
| 2006/0075146 A1 | 4/2006 | Schoinas et al. |
| 2007/0101099 A1* | 5/2007 | Shinohara et al. ............ 711/207 |
| 2007/0283123 A1 | 12/2007 | Vick et al. |
| 2007/0283125 A1 | 12/2007 | Manczak et al. |
| 2008/0086620 A1* | 4/2008 | Morris .......................... 711/203 |
| 2008/0162864 A1 | 7/2008 | Sugumar et al. |
| 2008/0189506 A1 | 8/2008 | Kopec et al. |
| 2009/0037906 A1 | 2/2009 | Armstrong et al. |
| 2009/0037941 A1 | 2/2009 | Armstrong et al. |
| 2009/0113164 A1 | 4/2009 | Rajamony et al. |
| 2009/0172341 A1 | 7/2009 | Durham et al. |
| 2009/0327648 A1 | 12/2009 | Savagaonkar et al. |
| 2010/0011187 A1* | 1/2010 | Schoinas et al. .............. 711/206 |
| 2010/0058358 A1 | 3/2010 | Franke et al. |
| 2010/0125708 A1 | 5/2010 | Hall et al. |
| 2010/0125709 A1* | 5/2010 | Hall et al. ..................... 711/154 |
| 2010/0180276 A1 | 7/2010 | Jiva |
| 2010/0250499 A1 | 9/2010 | McAlister et al. |
| 2010/0250869 A1 | 9/2010 | Adams et al. |
| 2010/0318761 A1 | 12/2010 | Moyer et al. |
| 2011/0016290 A1 | 1/2011 | Chobotaro et al. |
| 2011/0078388 A1* | 3/2011 | Gyuris et al. ................. 711/154 |
| 2011/0153909 A1 | 6/2011 | Dong |
| 2011/0197004 A1 | 8/2011 | Serebrin et al. |
| 2011/0239268 A1 | 9/2011 | Sharp et al. |
| 2011/0283040 A1 | 11/2011 | Chadha et al. |
| 2011/0320758 A1 | 12/2011 | Craddock et al. |
| 2011/0320758 A1 | 12/2011 | Craddock et al. |
| 2011/0320759 A1 | 12/2011 | Craddock et al. |
| 2011/0321158 A1 | 12/2011 | Craddock et al. |
| 2012/0011341 A1 | 1/2012 | Greiner et al. |
| 2012/0023300 A1 | 1/2012 | Tremaine et al. |
| 2012/0079479 A1 | 3/2012 | Hakewill |
| 2012/0110236 A1 | 5/2012 | Ali et al. |
| 2012/0137106 A1 | 5/2012 | Greiner et al. |
| 2012/0137288 A1 | 5/2012 | Barrett et al. |
| 2012/0159039 A1 | 6/2012 | Kegel et al. |
| 2012/0180047 A1 | 7/2012 | Cardona et al. |
| 2012/0185854 A1 | 7/2012 | Dahlstedt |
| 2012/0191940 A1 | 7/2012 | Brownlow et al. |
| 2012/0209894 A1 | 8/2012 | Kandasamy et al. |
| 2013/0024598 A1 | 1/2013 | Serebrin et al. |
| 2014/0047251 A1 | 2/2014 | Kottilingal et al. |
| 2014/0101360 A1 | 4/2014 | Gschwind |
| 2014/0101361 A1 | 4/2014 | Gschwind |
| 2014/0101362 A1 | 4/2014 | Gschwind |
| 2014/0101363 A1 | 4/2014 | Gschwind |
| 2014/0101364 A1 | 4/2014 | Gschwind |
| 2014/0101365 A1 | 4/2014 | Gschwind |
| 2014/0101402 A1 | 4/2014 | Gschwind |
| 2014/0101404 A1 | 4/2014 | Bybell et al. |
| 2014/0101406 A1 | 4/2014 | Gschwind |
| 2014/0101407 A1 | 4/2014 | Bybell et al. |
| 2014/0101408 A1 | 4/2014 | Bybell et al. |
| 2014/0108701 A1 | 4/2014 | Liljeberg |

OTHER PUBLICATIONS

Office Action for U.S. Appl. No. 13/646,771 dated Jul. 10, 2014, 22 pages.
Ben-Yehuda, Muli, et al., "The Turtles Project: Design and Implementation of Nested Virtualization," IBM Research Report H-0282 (H1001-004), Jan. 9, 2010, 14 pages.
Office Action for U.S. Appl. No. 13/789,124 dated Aug. 12, 2014, 17 pages.
International Search Report and Written Opinion for PCT/US2013/063675 dated Jan. 22, 2014, pp. 1-11.
International Search Report and Written Opinion for PCT/US2013/63651 dated Apr. 21, 2014, pp. 1-9.
Office Action for U.S. Appl. No. 13/646,779 dated Oct. 8, 2014, 26 pages.
Office Action for U.S. Appl. No. 13/784,082 dated Oct. 8, 2014, 20 pages.
Office Action for U.S. Appl. No. 13/646,788 dated Oct. 8, 2014, 23 pages.
Office Action for U.S. Appl. No. 13/788,895 dated Oct. 8, 2014, 17 pages.
Hoang, Giang et al., "A Case for Alternative Nesting Paging Models for Virtualized Systems," IEEE Computer Architecture Letters, Jan.-Jun. 2010, vol. 9, No. 1, pp. 17-20.
Barr, Thomas et al., "Translation Caching: Skip, Don't Walk (the Page Table)," ISCA '10, Jun. 2010, pp. 48-59.
Bybell, Anthony et al., "Selectable Address Translation Mechanisms," U.S. Appl. No. 13/646,771, filed Oct. 8, 2012.
Gschwind, Michael K., "Adjunct Component to Provide Full Virtualization Using Paravirtualized Hypervisors," U.S. Appl. No. 13/646,773, filed Oct. 8, 2012.
Gschwind, Michael K., "System Supporting Multiple Partitions with Differing Translation Formats," U.S. Appl. No. 13/646,779, filed Oct. 8, 2012.
Gschwind, Michael K., "Supporting Multiple Types of Guests by a Hypervisor," U.S. Appl. No. 13/646,782, filed Oct. 8, 2012.
Gschwind, Michael K., "Selectable Address Translation Mechanisms within a Partition," U.S. Appl. No. 13/646,788, filed Oct. 8, 2012.
"z/Architecture—Principles of Operation," Publication No. SA22-7932-08, 9$^{th}$ Edition, Aug. 2010.
Power ISA™ Version 2.06 Revision B specification, Jul. 23, 2010.
Intel Itanium Architecture Software Developer's Manual vol. 2: System Architecture, Document No. 245318-005, Jan. 2006.
Peng, C. Ray et al., "The Power PC Architecture: 64-Bit Power with 32-Bit Compatibility," pp. 300-307, 1995 (no further date information available).
Final Office Action for U.S. Appl. No. 13/646,770 dated Nov. 19, 2014, pp. 1-22.
Final Office Action for U.S. Appl. No. 13/789,148 dated Nov. 19, 2014, pp. 1-20.
Office Action for U.S. Appl. No. 13/789,124 dated Dec. 2, 2014, pp. 1-17.
Office Action for U.S. Appl. No. 13/646,771 dated Dec. 15, 2014, pp. 1-30.
Office Action for U.S. Appl. No. 13/646,773 dated Mar. 25, 2015, pp. 1-23.
Office Action for U.S. Appl. No. 13/789,101 dated Mar. 26, 2015, pp. 1-17.
Office Action for U.S. Appl. No. 13/646,782 dated Apr. 9, 2015, pp. 1-25.
Office Action for U.S. Appl. No. 13/789,083 dated Apr. 9, 2015, pp. 1-19.
Office Action for U.S. Appl. No. 13/646,771 dated Apr. 9, 2015, pp. 1-44.
Final Office Action for U.S. Appl. No. 13/646,788 dated May 5, 2015, pp. 1-16.
Final Office Action for U.S. Appl. No. 13/784,082 dated May 5, 2015, pp. 1-17.

(56) References Cited

OTHER PUBLICATIONS

Final Office Action for U.S. Appl. No. 13/646,779 dated May 6, 2015, pp. 1-21.
Final Office Action for U.S. Appl. No. 13/788,895 dated May 6, 2015, pp. 1-13.
International Search Report in related Application No. PCT/US2013/063672, dated Jan. 28, 2014, pp. 1-3.
Nakajima et al., "Hybrid Virtualization: Enhanced Virtualization for Linux", Proceedings of the Linux Symposium, 2007, vol. 2, pp. 87-96.
International Preliminary Report on Patentablility and Written Opinion in related Application No. PCT/US2013/063672, dated Apr. 8, 2015, pp. 1-5.
Notice of Allowance in U.S. Appl. No. 13/789,148, dated Jul. 16, 2015, pp. 1-7.
Final Office Action in U.S. Appl. No. 13/646,771, dated Sep. 22, 2015, pp. 1-41.
Notice of Allowance in U.S. Appl. No. 13/784,082, dated Sep. 24, 2015, pp. 1-7.
Notice of Allowance in U.S. Appl. No. 13/646,779, dated Sep. 30, 2015, pp. 1-7.
Office Action in U.S. Appl. No. 13/788,895, dated Oct. 6, 2015, pp. 1-13.
Final Office Action in U.S. Appl. No. 13/646,773, dated Oct. 7, 2015, pp. 1-17.
Final Office Action in U.S. Appl. No. 13/789,101, dated Oct. 7, 2015, pp. 1-13.
Office Action in U.S. Appl. No. 13/646,788, dated Oct. 8, 2015, pp. 1-17.
Notice of Allowance in U.S. Appl. No. 13/646,782, dated Oct. 23, 2015, pp. 1-10.
Notice of Allowance in U.S. Appl. No. 13/789,083, dated Oct. 23, 2015, pp. 1-10.
Notice of Allowance in U.S. Appl. No. 13/789,083, dated Dec. 4, 2015, pp. 1-14.
Notice of Allowance in U.S. Appl. No. 13/784,082, dated Dec. 7, 2015, pp. 1-14.

* cited by examiner

ASYMMETRIC CO-EXISTENT ADDRESS TRANSLATION STRUCTURE FORMATS

BACKGROUND

One or more aspects relate, in general, to memory of a computing environment, and in particular, to facilitating translation of memory addresses used to access the memory.

System configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes an effective address. The effective address is translated into a real address used to access the physical memory.

Translation is performed using an address translation technique. Several address translation techniques are available. For instance, in PowerPC systems offered by International Business Machines Corporation, an effective address is translated to a corresponding real address by way of page table entries found by selecting an effective segment identifier (ESID) table entry associated with the effective address, and using the entry to locate a group of page table entries by way of a hashing algorithm. In a further example, in the z/Architecture, also offered by International Business Machines Corporation, an effective address is translated to a corresponding real address by way of a hierarchy of translation tables. Translation tables are indexed by a portion of the effective address to find the address of the next translation table of the hierarchy until a real (or absolute) address is obtained. Both address translation techniques provide advantages to their respective operating systems.

BRIEF SUMMARY

Shortcomings of the prior art are overcome and additional advantages are provided through the provision of a computer program product for facilitating translation of a memory address. The computer program product comprises a storage medium readable by a processing circuit and storing instructions for execution by the processing circuit for performing a method. The method includes, for instance, determining, by a processor, whether a first address translation structure of a first type is to be used to translate a memory address; based on the determining that a first address translation structure of the first type is to be used, accessing a second address translation structure of a second type, the second type being different from the first type, to determine a particular first address translation structure to be used and to obtain an origin address of that particular first address translation structure; and using the particular first address translation structure in translating the memory address.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one aspect, an address translation capability is provided in which translation structures of different types are used to translate memory addresses from one format (e.g., an effective address, and in particular, a virtual address associated therewith) to another format (e.g., a real address). Multiple translation structure formats (e.g., multiple page table formats, such as hash page tables and hierarchical page tables) are concurrently supported in a system configuration. This facilitates provision of guest access in virtualized operating systems, and/or the mixing of translation formats to better match the data access patterns being translated.

Computing environments of different architectures may incorporate and use one or more aspects of the address translation capability provided herein. For instance, environments based on the PowerPC architecture, also referred to as Power ISA, offered by International Business Machines Corporation and described in the Power ISA™ Version 2.06 Revision B specification, Jul. 23, 2010, incorporated herein by reference in its entirety, may include one or more aspects, as well as computing environments of other architectures, such as the z/Architecture, offered by International Business Machines Corporation, and described in z/Architecture—Principles of Operation, Publication No. SA22-7932-08, 9th Edition, August 2010, which is hereby incorporated herein by reference in its entirety.

Figure 1A:
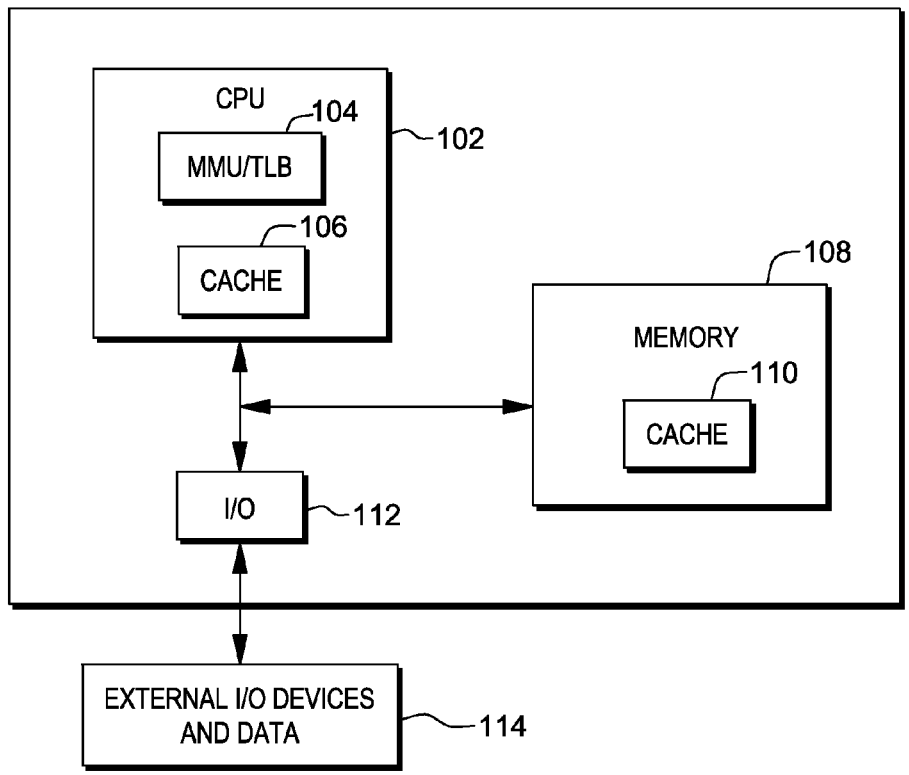
FIG. 1A depicts one example of a computing environment to incorporate and use one or more aspects of a translation capability.

One example of a computing environment to incorporate and use one or more aspects of the translation capability is described with reference to FIG. 1A. In one example, a computing environment 100 includes a processor (central processing unit—CPU) 102 that includes at least one memory management unit (MMU)/translation lookaside buffer (TLB) portion 104 and a cache 106. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes a translation lookaside buffer (TLB). The TLB is a cache of previously translated addresses. Thus, when a request is received for a memory access that includes an address to be translated, the TLB is checked first. If the address and its translation are in the TLB, then no translation is necessary. Otherwise, the received address is translated using one of any number of translation techniques.

Figure 1B:
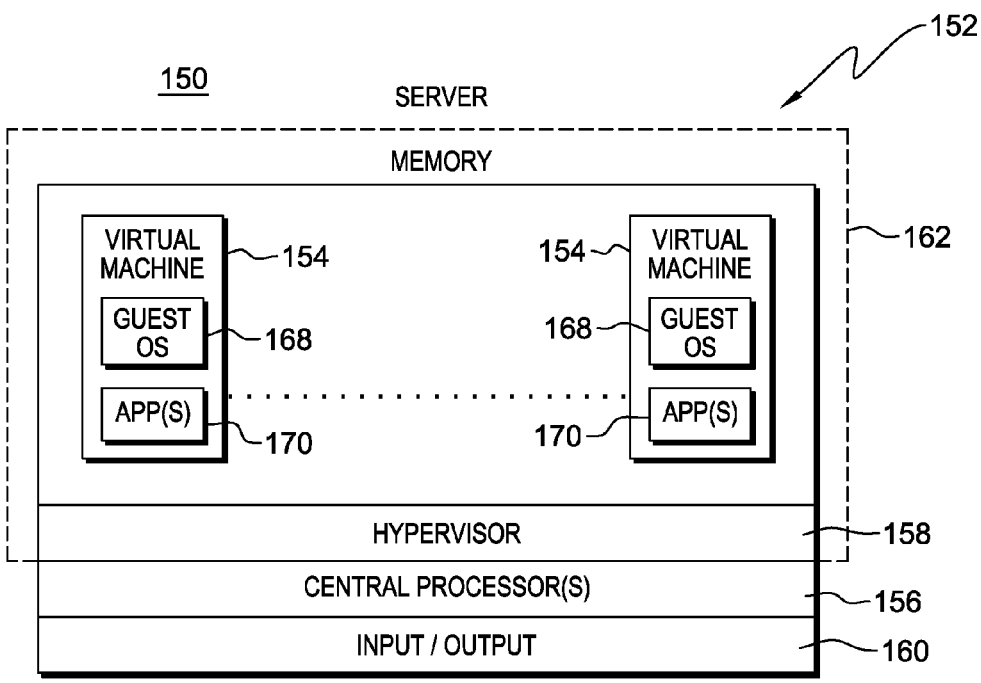
FIG. 1B depicts another example of a computing environment to incorporate and use one or more aspects of a translation capability.

A further embodiment of a computing environment to incorporate and use one or more aspects of the present invention is depicted in FIG. 1B. In this example, a computing environment 150 includes a server 152 that includes, for instance, one or more virtual machines 154, one or more central processors (e.g., central processing units) 156, at least one hypervisor 158, and an input/output subsystem 160. The virtual machines and hypervisor are included in memory 162.

In this embodiment, each virtual machine is capable of hosting a guest operating system 168 and may be executing one or more applications 170. An operating system or application running in a virtual machine appears to have access to a full complete system, but in reality, only a portion of it is available.

Central processors 156 (e.g., central processing units) are physical processor resources that are assignable to a virtual machine. For instance, virtual machine 154 includes one or more logical processors, each of which represents all or a share of a physical processor 156 that may be dynamically allocated to the virtual machine. Virtual machines 154 are managed by hypervisor 158, such as PowerVM, offered by International Business Machines Corporation, as examples.

Central processor 156, like CPU 102, includes at least one MMU/TLB portion and at least one cache.

Input/output subsystem 160 directs the flow of information between devices and memory (also referred to herein as main memory or main storage). It is coupled to the server in that it can be part of the server or separate therefrom. The I/O subsystem relieves the central processors of the task of communicating directly with the I/O devices coupled to the server and permits data processing to proceed concurrently with I/O processing.

Figure 2A:
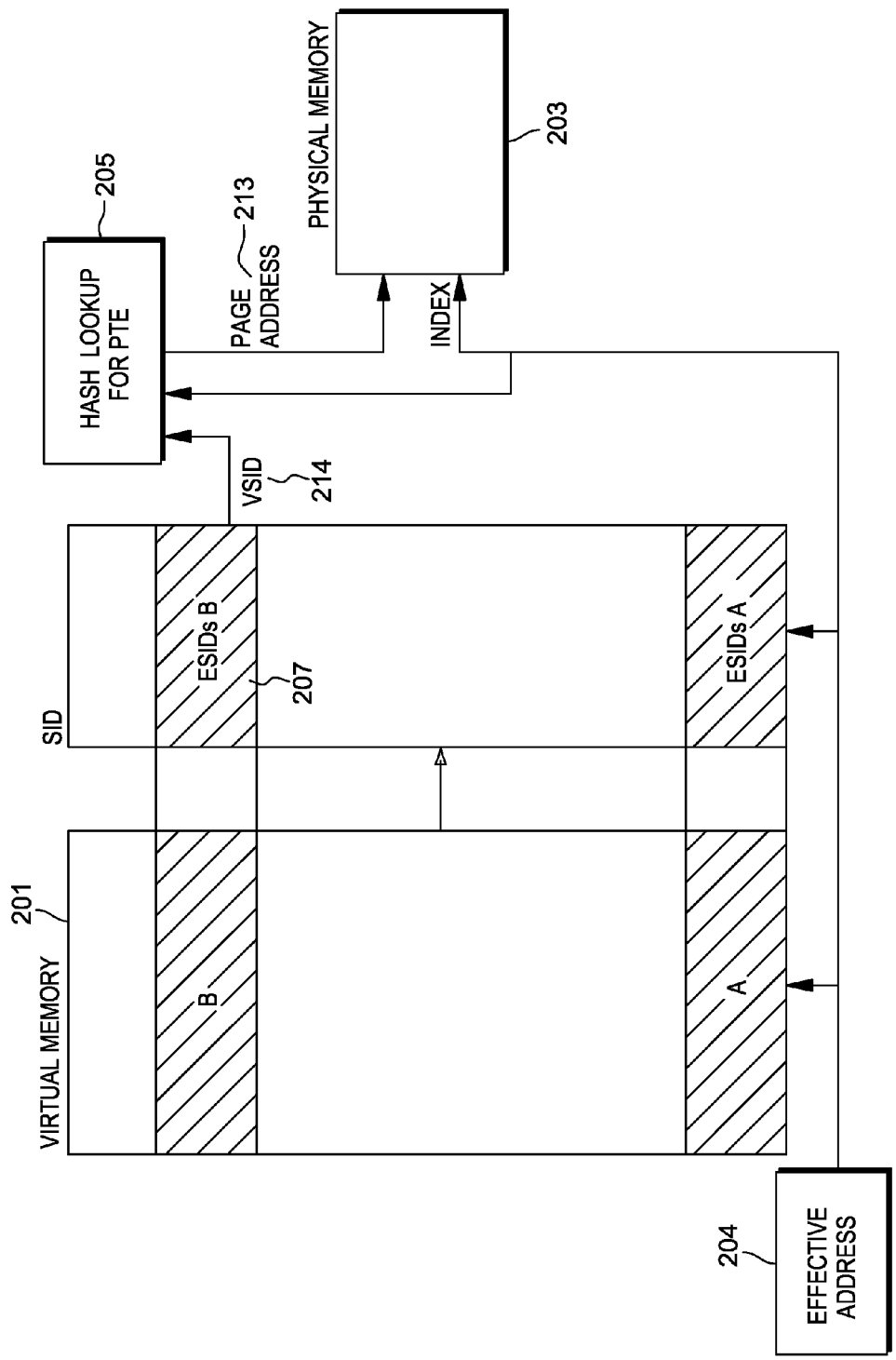
FIG. 2A illustrates an example of a high-level view of a virtual memory mapped to a physical memory using a hash page table technique.

Further details regarding the physical memory used by either system, such as memory 108 or memory 162, and access thereto are described with reference to FIG. 2A. As is known, physical memory is of a defined size and in order to have the physical memory appear larger than it is, virtual memory is utilized. One example of a high-level view of virtual memory 201 mapped to a physical memory 203 (such as memory 108, 162) is depicted in FIG. 2A. In this example, the mapping from virtual memory to real memory is via a hash page table (HPT) technique 205 to locate page table entries (PTEs), as used by, for example, Power ISA. In this example, programs only use sections A and B of the virtual memory. Each segment of the virtual memory is mapped to a segment ID (SID) entry 207 identified by an effective segment ID (ESID) (ESIDs for B and ESIDs for A included). An "effective address" 204 used by the program selects an SID entry, which includes the ESID value, as well as a virtual segment ID (VSID) 214 value. The VSID value represents the high-order bits of a virtual address to be used by hashing algorithm 205 to search the hash page table. A hashed value based on the VSID is used to locate a page table entry (PTE). The page table entry includes an address 213 of a page of physical memory 203.

Figure 2B:
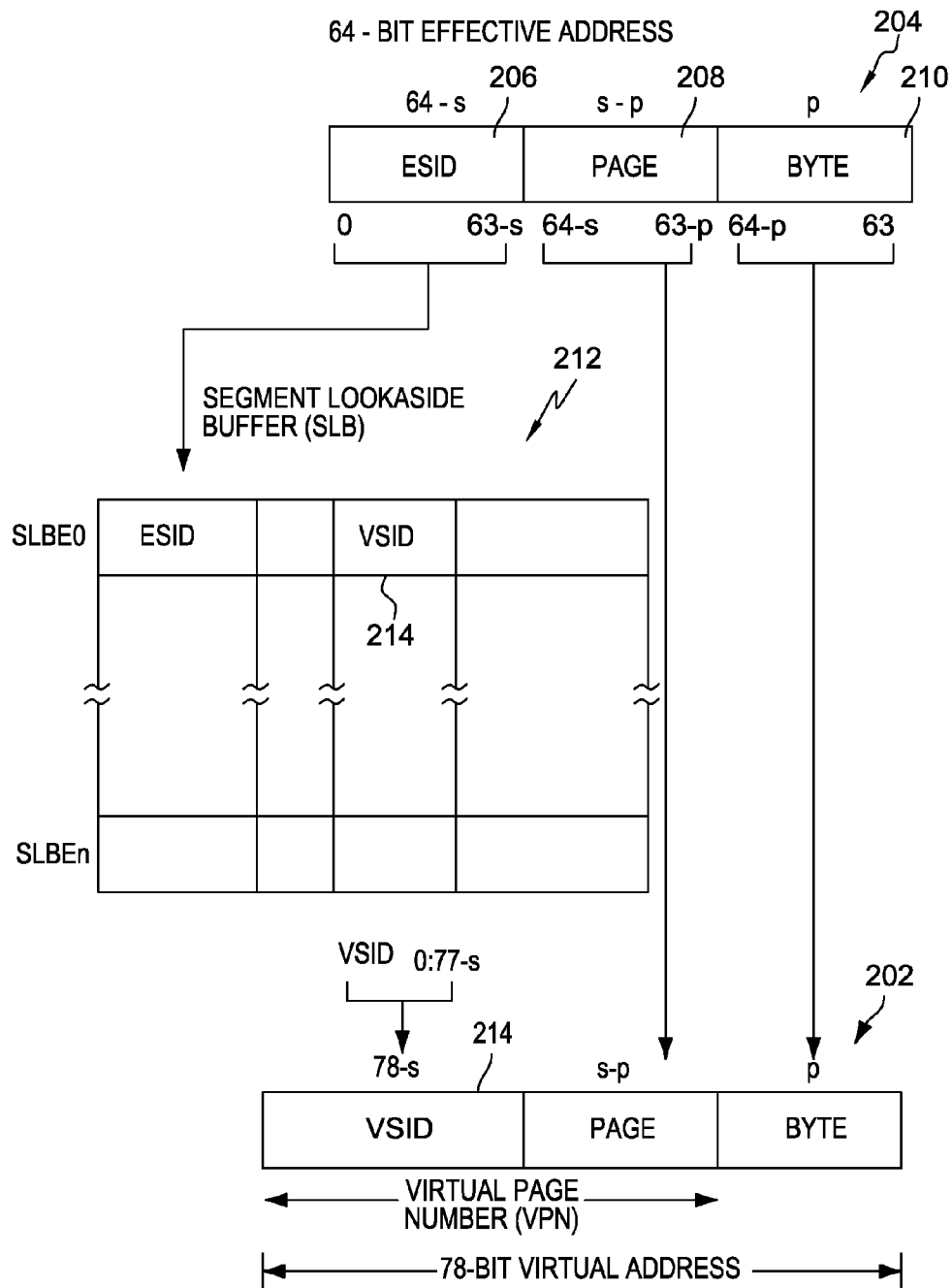
FIG. 2B illustrates one example of a technique for generating a virtual address.

FIG. 2B illustrates an example of a technique for generating a virtual address 202 for hashing. In this regard, an effective address 204 is received in, for instance, a memory management unit of a processor. Effective address 204 includes an effective segment identifier (ESID) field 206, a page field 208 and byte offset field 210. The ESID field is used to locate an entry in a segment lookaside buffer (SLB) 212, which is a cache of recently accessed segment ID entries. In particular, the SLB is searched for an entry with a value of ESID 206 of the effective address 204. The entry with the ESID 206 includes an associated virtual segment identifier (VSID) 214, as well as other information, as described below. The associated VSID is used to generate virtual address 202, which includes VSID 214; and page 208 and byte 210 from the effective address 204. Virtual address 202 is used to obtain a real address used to access physical memory in the memory system. In this disclosure, the terms physical memory, real memory, system memory and absolute memory are used interchangeably to refer to the main storage accessible to a processor.

Figure 2C:
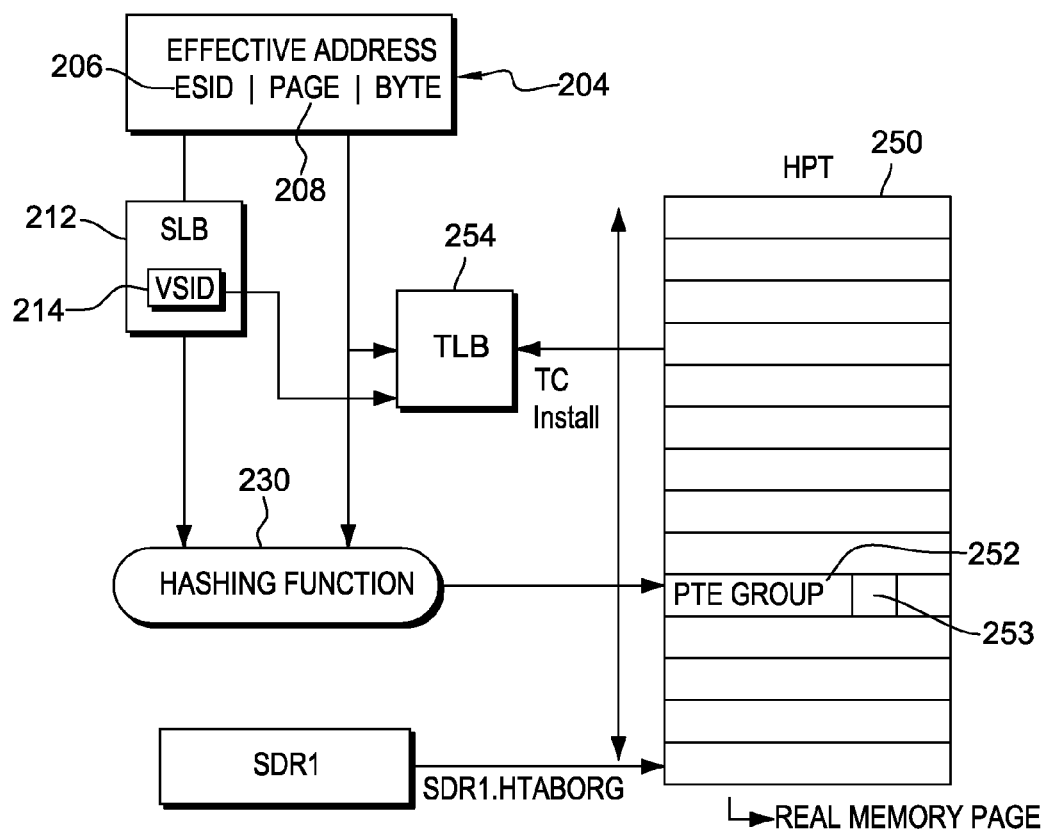
FIG. 2C depicts one example of a hash page table translation structure.

FIG. 2C illustrates an example of a hash page table (HPT) translation structure used by Power ISA. ESID portion 206 of an effective address (EA) 204 is used to locate an entry in SLB 212. The entry includes a VSID field 214. The value of VSID field 214 and a portion of EA 204 (page.byte) are hashed 230 to produce a hash value that is used to locate a page table entry (PTE) group 252 in a hash page table (HPT) 250. Page table entries 253 of PTE group 252 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 208 of EA 204 and the address of the physical memory page found in the PTE are stored in the TLB 254, such that further accesses to the same EA page will "hit" in the TLB 254 and avoid the PTE search. The page table is located by a page table origin address provided by the processor.

Figure 3:
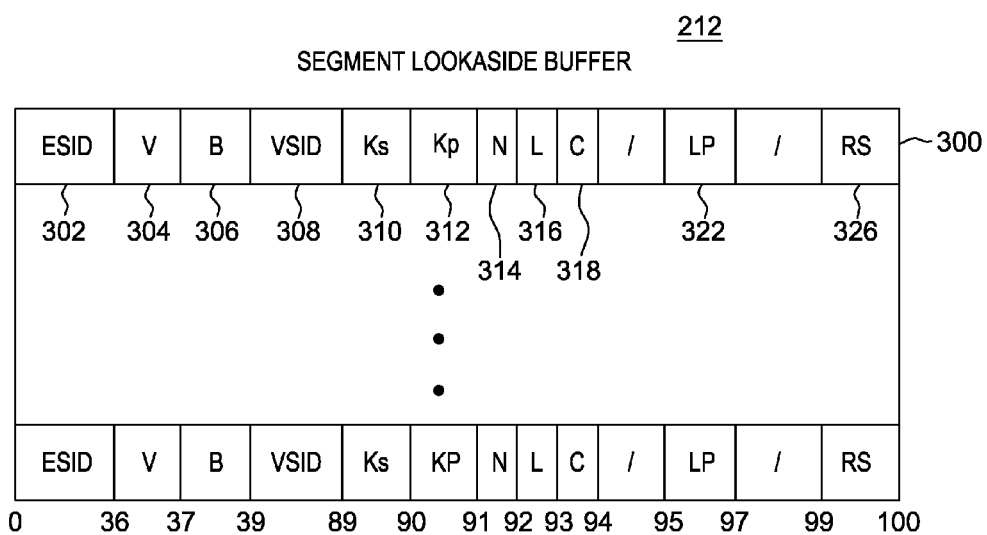
FIG. 3 depicts one example of a segment lookaside buffer, including example fields of a segment lookaside buffer entry.

Further details regarding a segment lookaside buffer and a page table are described with reference to FIGS. 3 and 4A-4B. Referring initially to FIG. 3, a segment lookaside buffer (SLB) 212 specifies the mapping between effective segment IDs (ESIDs) and virtual segment IDs (VSIDs). The number of SLB entries (SLBE) in an SLB is implementation dependent, and in one example, includes at least 32 entries. In one example, segment lookaside buffer 212 includes a plurality of SLB entries 300, and each SLB entry 300 maps one ESID 302 to one VSID 308. In one example, SLBE 300 includes the following fields:

Effective segment ID (ESID) 302 (bits 0-35);
Entry valid indicator (V) 304 (bit 36) which indicates whether the entry is valid (V=1) or invalid (V=0);
Segment sized selector (B) 306 (bits 37-38), which has the following meaning, in one example: 0b00—256 Megabytes (MB) (s=28), 0b01—1 Terabyte (TB) (s=40), 0b10—256 TB (s=48), and 0b11—reserved;
Virtual segment ID (VSID) 308 (bits 39-88);
Supervisor (privileged) state storage key indicator ($K_s$) 310 (bit 89);
Problem state storage key indicator ($K_p$) 312 (bit 90);
No-execute segment if N=1 indicator (N) 314 (bit 91);
Virtual page size selector bit 0 (L) 316 (bit 92);
Class indicator (C) 318 (bit 93);
Virtual page size selector bits 1:2 (LP) 322 (bits 95-96); and
Radix segment indicator (RS) 326 (bit 99), which, in one example, 0 indicates disabled and 1 indicates enabled. When RS=1, the virtual address used for the hash page table search has the lowest S (encoded in $SLBE_B$) number of bits set to zero.

In one embodiment, instructions cannot be executed from a no-execute (N=1) segment. Segments may contain a mixture of page sizes. The L and LP bits specify the base virtual page size that the segment may contain. The $SLB_{L||LP}$ encodings are those shown below, in one example:

| encoding | base page size |
| --- | --- |
| 0b000 | 4 KB |
| 0b101 | 64 KB |
| additional values | $2^b$ bytes, where b >12 and b may differ among encoding values, | where the "additional values" are implementation-dependent, as are the corresponding base virtual page sizes. The values that are not supported by a given implementation are reserved in that implementation.

The base virtual page size also referred to as the base page size is the smallest virtual page size for the segment. The base virtual page size is $2^b$ bytes. The actual virtual page size (also referred to as the actual page size or virtual page size) is specified by $PTE_{L||LP}$.

The Class field is used in conjunction with the SLB Invalidate Entry (SLBIE) and SLB Invalidate All (SLBIA) instructions. Class refers to a grouping of SLB entries and implementation-specific lookaside information so that only entries in a certain group need be invalidated and others might be preserved. The class value assigned to an implementation-specific lookaside entry derived from an SLB entry is to match the class value of that SLB entry. The class value assigned to an implementation-specific lookaside entry that is not derived from an SLB entry (such as real mode address translations) is 0.

Software is to ensure that the SLB contains at most one entry that translates a given instruction effective address. An attempt to create an SLB entry that violates this requirement may cause a machine check.

As described herein, at least one field of the SLB is used to access a page table, and in particular, a specific page table entry. Further information regarding a page table and page table entries is described with reference to FIGS. 4A-4B. In this example, the page table and its corresponding entries are for the Power ISA architecture; however, other page tables and entries may be used for other architectures.

Figure 4A:
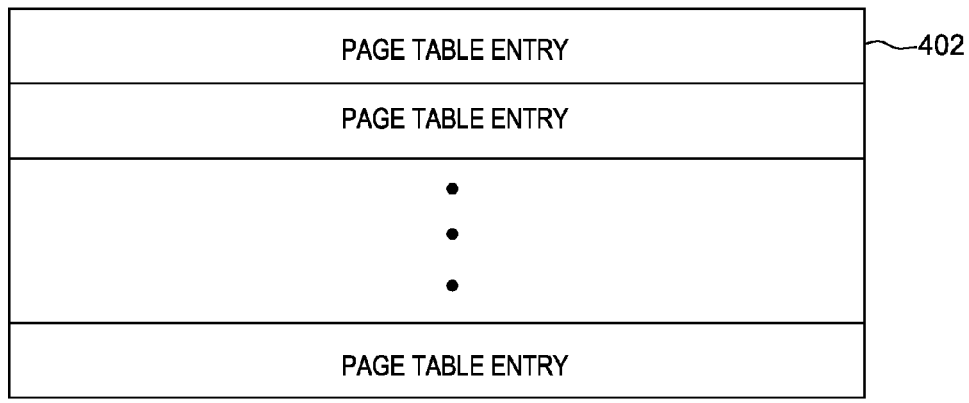
FIG. 4A depicts one example of a page table.
Figure 4B:
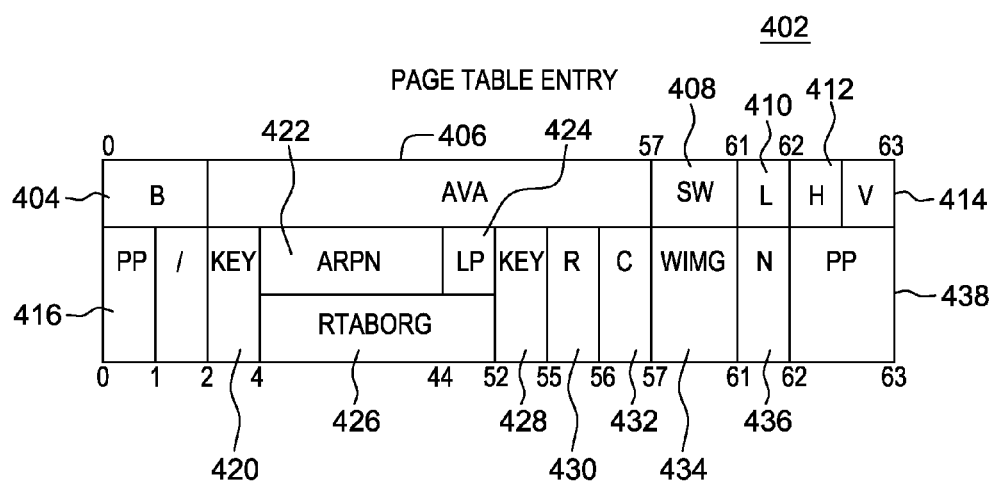
FIG. 4B depicts one example of a page table entry.

Referring initially to FIG. 4A, a page table 400 includes one or more page table entries 402. As one example, page table 400 is a hash page table (HPT), which is a variable-sized data structure that specifies the mapping between virtual page numbers (VPN) and real page numbers (RPN), where the real page number of a real page is, for instance, bits 0:47 of the address of the first byte in the real page. The hash page table size can be any size $2^n$ bytes where $18 \leq n \leq 46$. The hash page table is to be located in storage having the storage control attributes that are used for implicit accesses to it. In one embodiment, the starting address is to be a multiple of its size unless the implementation supports a server.relaxed page table alignment category, in which case its starting address is a multiple of $2^{18}$ bytes, as an example.

In one example, the hash page table contains page table entry groups (PTEGs). A page table entry group contains, for instance, eight page table entries of 16 bytes each; each page table entry group is thus 128 bytes long. PTEGs are entry points for searches of the page table.

Further details of a page table entry are described with reference to FIG. 4B. Each page table entry 402 maps one virtual number to one real page number. As an example for the Power ISA architecture, a page table entry includes the following:

| Dword | Bit(s) | Name | Description |
| --- | --- | --- | --- |
| 0 | 0:1 | B (404) | Segment Size 0b00—256 MB; 0b01—1 TB; 0b10—256 TB; 0b11—reserved |
| | 2:56 | AVA (406) | Abbreviated Virtual Address |
| | 57:60 | SW (408) | Available for software use |
| | 61 | L (410) | Virtual page size 0b0—4 KB 0b1—greater than 4 KB (large page) |
| | 62 | H (412) | Hash function identifier |
| | 63 | V (414) | Entry valid (V = 1) or invalid (V = 0) |
| 1 | 0 | PP (416) | Page Protection bit 0 |
| | 1 | / | Reserved |
| | 2:3 | key (420) | KEY bits 0:1 |
| | 4:43 | ARPN (422) | Abbreviated Real Page Number |
| | 44:51 | LP (424) | Large page size selector |
| | 4:51 | RTABORG (426) | Virtualized real address of Radix Table (when $SLBE_{RS}$ = 1 or $VRMASD_{RS}$ = 1) |
| | 52:54 | key (428) | KEY bits 2:4 |
| | 55 | R (430) | Reference bit |
| | 56 | C (432) | Change bit |
| | 57:60 | WIMG (434) | Storage control bits |
| | 61 | N (436) | No-execute page if N = 1 |
| | 62:63 | PP (438) | Page Protection bits 1:2 |

Further details regarding one implementation of page tables and page table entries are described in Power ISA™ Version 2.06 Revision B specification, Jul. 23, 2010, offered by International Business Machines Corporation and incorporated herein by reference in its entirety.

The use of a hash page table to translate addresses is only one example of a translation technique. Other address translation schemes, including those that use a hierarchy of translation tables, are described below, as well as in the following publications: z/Architecture—Principles of Operation, Publication No. SA22-7932-08, 9th Edition, August 2010, and Intel Itanium Architecture Software Developer's Manual Volume 2: System Architecture, Document Number: 245318-005, each hereby incorporated herein by reference in its entirety. In one example, for the z/Architecture, the hierarchy of tables is referred to as dynamic address translation (DAT) tables; and for Power ISA, the tables are referred to as radix tables.

Figure 5A:
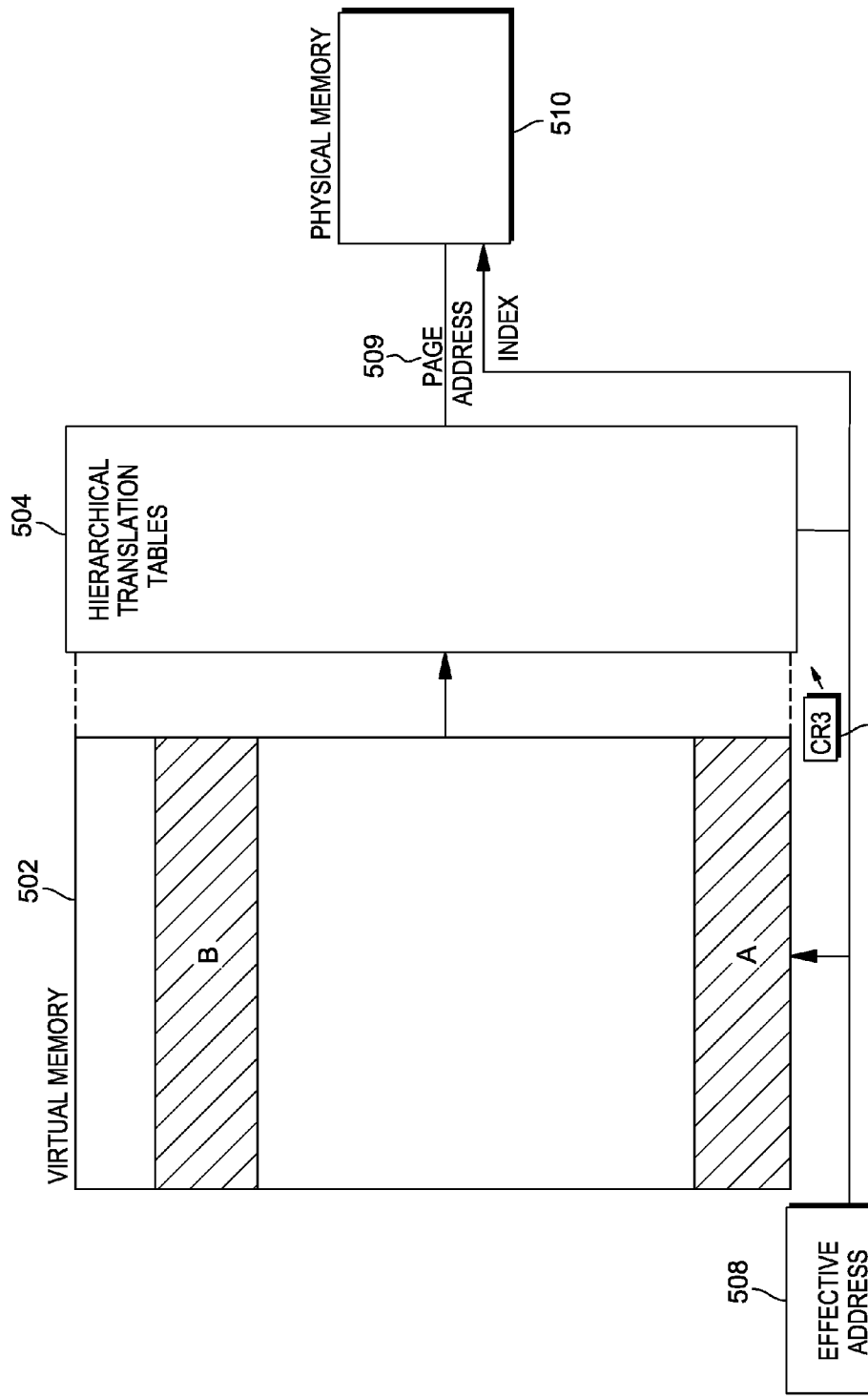
FIG. 5A depicts one example of a hierarchical translation mechanism.

One example of a hierarchical translation table translation mechanism is described with reference to FIG. 5A. In this example, translation tables 504 are provided for translating addresses of virtual memory 502, though only regions A and B are to be used, in this example, to real addresses. The origin of the highest order translation table of the hierarchical translation tables 504, is provided, for example, by a control register (CR3) 506. An effective address 508 is used to index into each table of the hierarchical translation tables 504 to determine an origin address of the next table until, for example, a page table entry (PTE) having an address 509 of a page of physical memory 510 is located. In one example in which the translation mechanism is DAT, the effective address is a virtual address having a plurality of indices used to index into the translation tables.

Figure 5B:
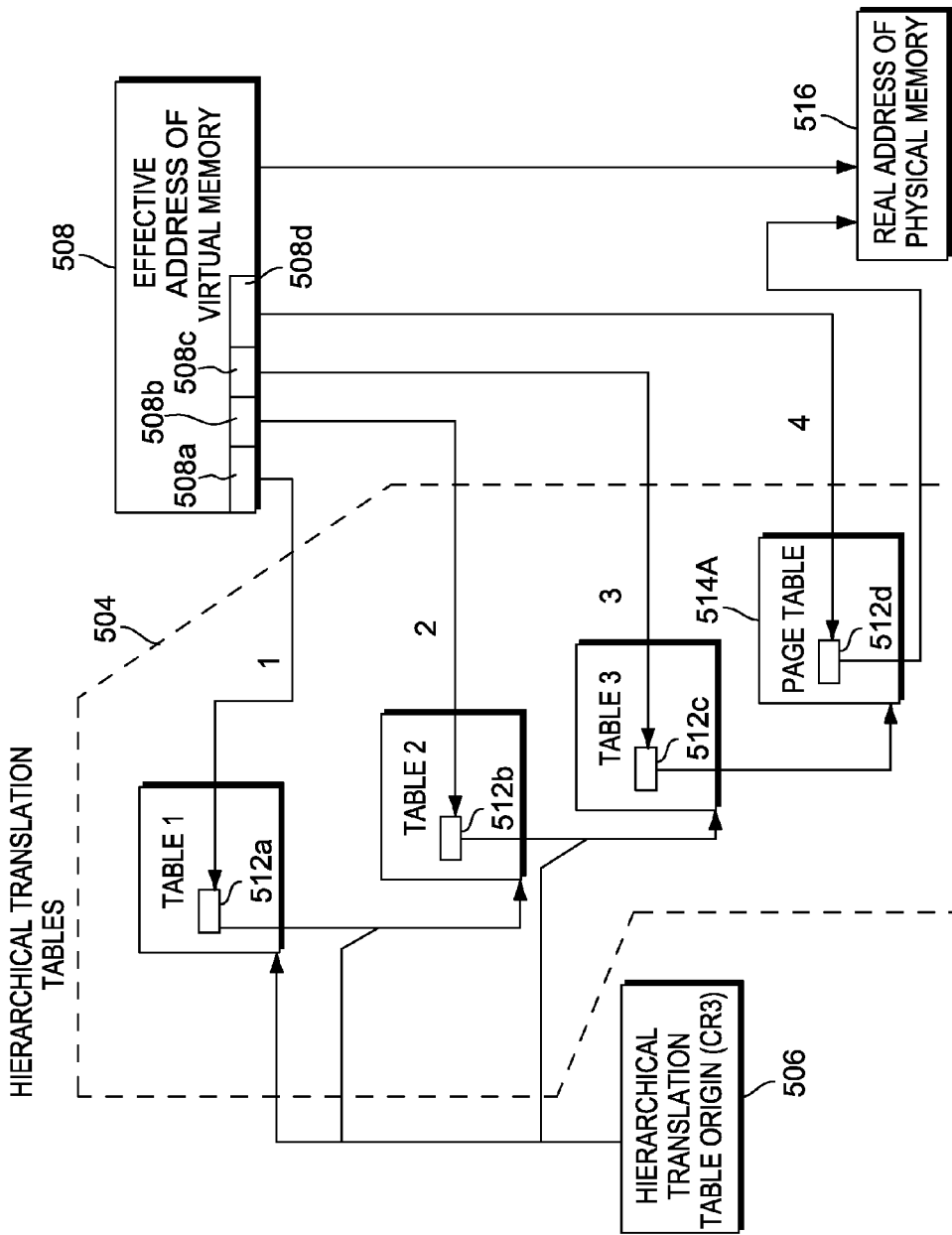
FIG. 5B depicts one example of indexing of high-level translation tables.

FIG. 5B shows one example in which the highest level translation table of the hierarchy is "indexed" by the high portion 508a of an effective address 508 to locate a Table 1 entry 512a that is used to locate the next translation table (Table 2). That is, entry 512a includes an origin address of Table 2. Similarly, a next portion 508b of the effective address 508 is used to index into Table 2 to find a Table 2 entry 512b having the origin address of Table 3. A next portion of the effective address 508c is used to index into Table 3 to find a Table 3 entry 512c having an origin address of a Page Table 514a. A next portion 508d of the effective address 508 is used to index into Page Table 514a to locate a page table entry 512d having the address of a physical memory page 516. The origin of the hierarchy of translation tables, in one embodiment, may include a table selector field for determining which of the hierarchy of translation tables, the origin applies. Thus, the translation may require only a subset of the hierarchy (wherein an effective address is limited to include a predetermined number of most significant bits having a zero value). A translation using fewer tables will be faster than one using more tables.

The page table entry located by traversing the hierarchical page tables includes various information including at least a portion of a real address used to access the physical memory. The format and information included in the page table entry depends on the architecture of the system configuration and/or the specific type of translation.

Figure 6A:
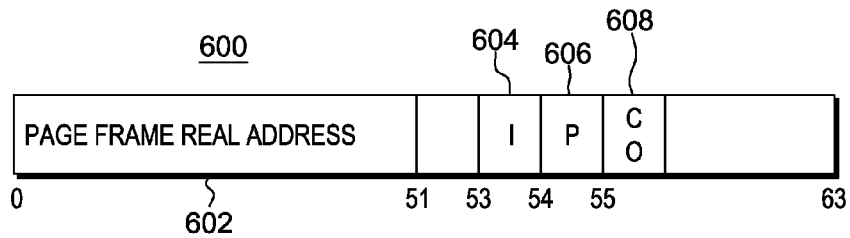
FIG. 6A depicts an example of a page table entry for the z/Architecture.

In one example in which the address translation is the DAT translation of the z/Architecture, a page table entry 600 includes the following, as depicted in FIG. 6A:
 Page-Frame Real Address (PFRA) (602): Bits 0-51 provide the leftmost bits of a real storage address. When these bits are concatenated with the 12-bit byte index field of the virtual address on the right, a 64-bit real address is provided;
 Page-Invalid bit 604 (I): Bit 53 controls whether the page associated with the page table entry is available. When the bit is zero, address translation proceeds by using the page table entry. When the bit is one, the page table entry is not to be used for translation;
 DAT-Protection Bit (P) 606: Bit 54 controls whether store accesses can be made in the page. This protection mechanism is in addition to the key-controlled-protection and low-address-protection mechanisms. The bit has no effect on fetch accesses; and
 Change-Recording Override (CO) 608: When enhanced DAT does not apply, bit 55 of the page-table entry is to contain zero; otherwise, a translation-specification exception is recognized as part of the execution of an instruction using that entry for address translation. When enhanced DAT applies and a segment table entry (STE) format control is zero, bit 55 of the page-table entry is the change-recording override for the page.

Figure 6B:
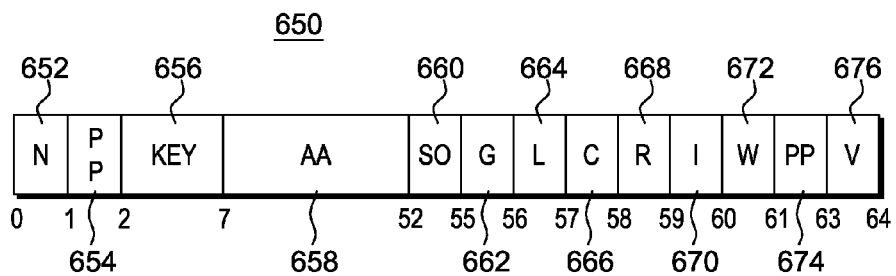
FIG. 6B depicts one example of a page table entry for the Power ISA architecture.

As a further example in which the address translation is the radix translation of Power ISA, a page table entry includes the following fields, as depicted in FIG. 6B. The format of this page table entry includes at least some fields similar to the fields of the page table entry obtained using the hash technique for Power ISA. In one example, page table entry 650 includes:

| Bits | Name | Description |
|---|---|---|
| 0 | N (652) | No-execute page if N = 1 |
| 1 | PP (654) | Page Protections 0 |
| 2-6 | Key (656) | KEY bits 0:4 |
| 7-51 | AA (658) | Abbreviated Address (concatenated with twelve zeros) |
| 52-54 | SO (660) | Available for software |
| 55 | G (662) | Guarded |
| 56 | L (664) | Leaf |
| | | 0—is Page Directory Entry (PDE) (0-1, 52-55, 57-62 ignored) |
| | | 1—is Page Table Entry (PTE) |
| 57 | C (666) | Changed |
| 58 | R (668) | Reference |
| 59 | I (670) | Cache Inhibited |
| 60 | W (672) | Writethrough |
| 61-62 | PP (674) | Page Protections 1:2 |
| 63 | V (676) | Valid Entry Indicator |

In accordance with one aspect, a system configuration is provided with different types of address translation structures for use in translating addresses. As examples, one type includes a hierarchical data structure (e.g., a radix structure), and another type includes a hash data structure. Further, in one example, the multiple types of translation structures are used to translate a particular address. In such a scenario, in one embodiment, one structure is used as an indirect pointer to another structure. The use of multiple types of structures is indicated by an indicator, such as an indicator in an SLBE, in one example.

Figure 7:
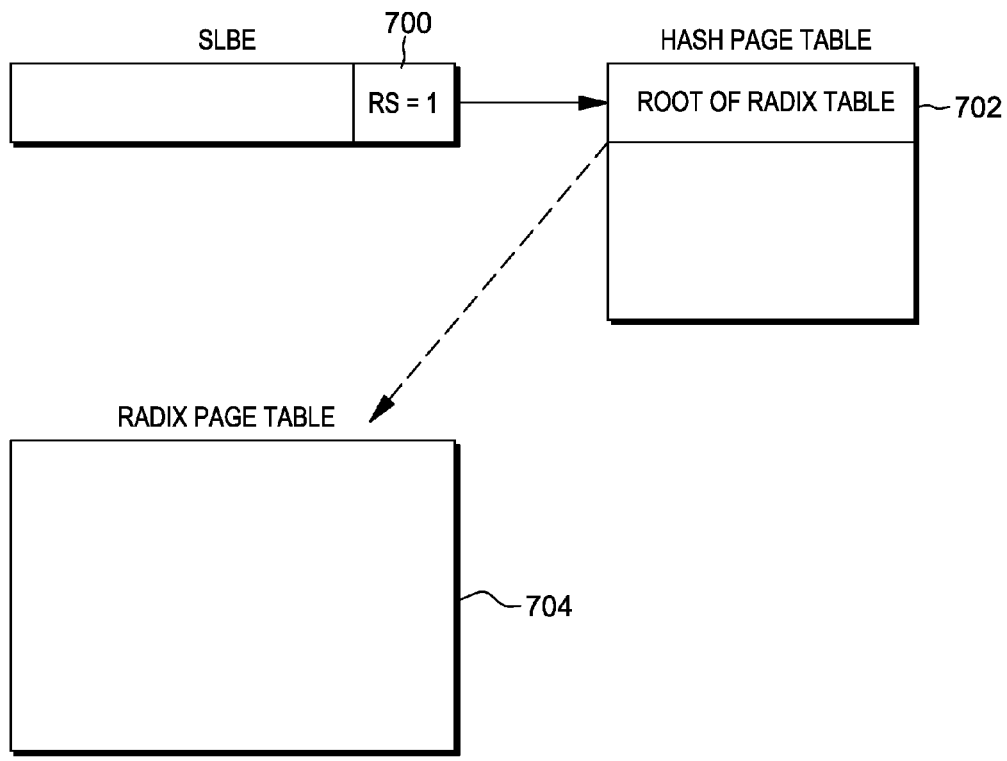
FIG. 7 depicts one example of using a translation structure of one type to point to a translation structure of another type to perform address translation.

For instance, in one aspect, depending on the value of an indicator in the SLBE, instead of using just one type of translation paging structure (e.g., the hash page table or the hierarchical page table) to translate a memory address, multiple types of translation paging structures are used. For example, the hash page table is used to obtain the root or origin of a hierarchical page table (i.e., the virtual real address of the first table in the hierarchy of tables), and the hierarchical page table is used in the address translation. This is depicted in FIG. 7. As shown, in the case where $SLBE_{RS}=1$ (700), a PTE (702) found during a hash PTE search is an indirect PTE used to point to a hierarchical page table 704 that can be manipulated by non-hypervisor code. In this example, the hierarchical page table is a radix page table (RTAB) to be used by, for instance, the Power ISA architecture, along with the hash table. The ARPN and LP fields of the hash page table entry (located during a hash translation) are replaced by the RTABORG, which is the virtualized real address of the radix page table. The radix page table is then used, in one example, to obtain a virtual real address (a.k.a., guest physical address) of physical memory to be accessed. The virtual real address is then converted, in one embodiment, to a host physical address via, for instance, a hash mechanism or a radix mechanism.

The radix page table is, for instance, a hierarchical, variable sized data structure that specifies the mapping between virtual page numbers and real page numbers, virtual page numbers and virtualized real page numbers, or virtualized real page numbers and real page numbers, where the real page number of a real page is, for instance, bits 0-44 of the address of the first byte of the real page. The RTAB is located in storage having the storage control attributes that are used for implicit access to it. The starting address is aligned in one example to a 4K boundary. The RTAB includes a series of 512-entry tables, in one embodiment.

One embodiment of the logic associated with translating a memory address using a translation technique that includes multiple types of translation structures is described with reference to FIG. 8A. In this example, the environment is a virtualized environment having one or more guests (e.g., guest operating systems executing within partitions) supported by a host (e.g., a host machine including a host operating system and/or a hypervisor), and the address being translated is a guest virtual address (obtained based on an effective address) to a host physical address (a.k.a., host real address). Since this is a guest/host environment, additional translation is performed to obtain the real address, as described below.

Figure 8A:
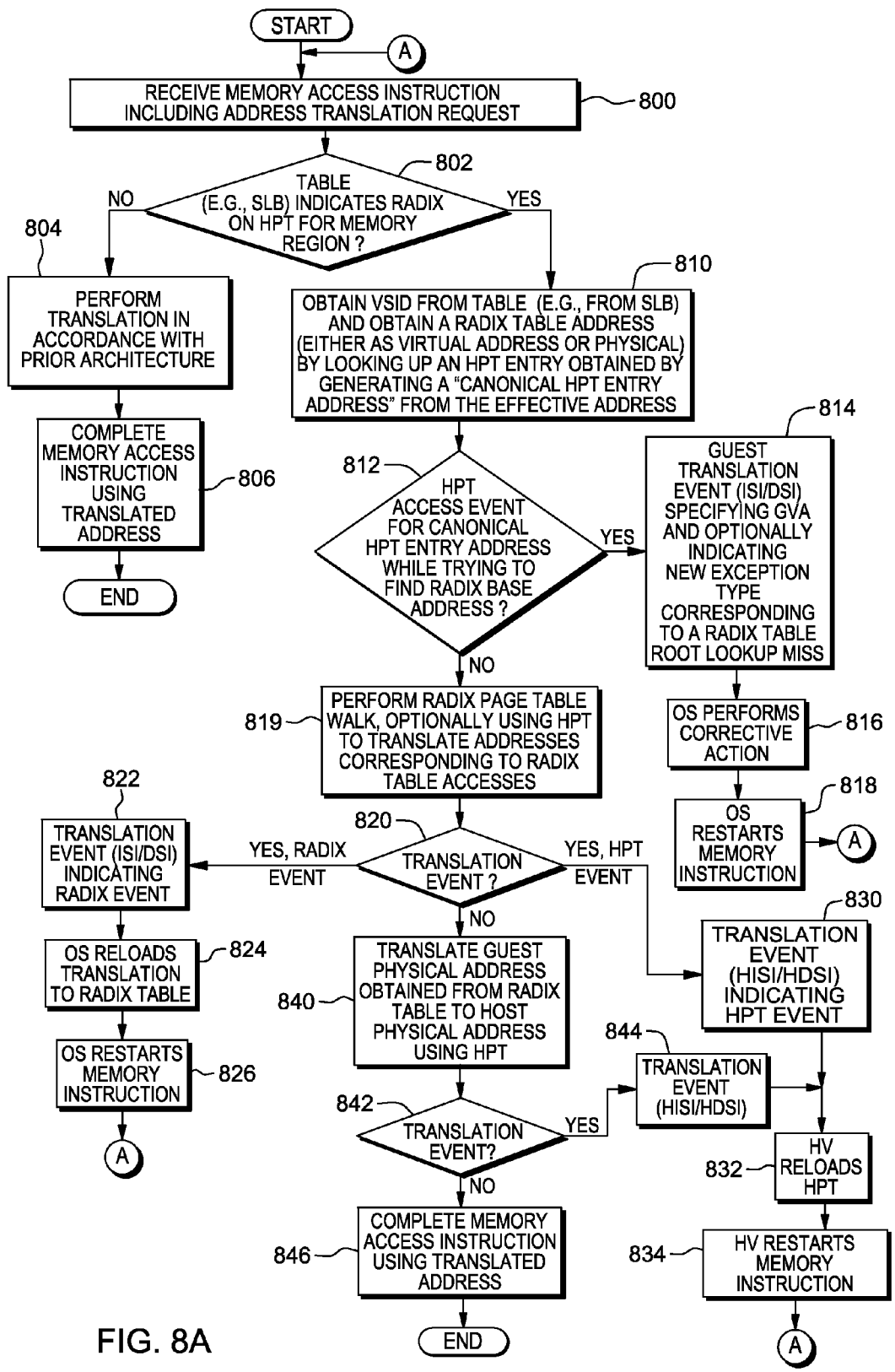
FIG. 8A depicts one embodiment of the logic to translate an address using multiple types of translation mechanisms.

Referring to FIG. 8A, initially, the hardware within a partition (e.g., MMU of a processor of the virtualized environment) receives a memory access request which includes a memory address translation request for an effective address, STEP 800. The memory address request may be a memory operation to load/store, a memory operand in an instruction, an instruction address to be accessed during instruction fetch, a load real address, or a prefetch instruction, as examples.

A determination is made as to whether multiple types of translation data structures are to be used to translate the effective address of the request to a real address, INQUIRY 802. For instance, in this particular example, the SLBE associated with the address to be translated (found using the ESID in the request) is checked to determine if the RS indicator of the SLBE is set to one. Since, in this example, the configuration is a guest/host configuration, the logical identifier of the guest partition is used to find the appropriate SLB, and the ESID is used to locate the correct SLBE. If the RS indicator in the SLBE is not set to one, then translation is performed in accordance with prior architecture translation schemes, STEP 804. For instance, a conventional hash page table translation is used to translate the virtual address to a physical address, as described below. Thereafter, the memory access instruction is completed using the translated address, STEP 806.

Returning to INQUIRY 802, if the indicator specifies that multiple types of translation formats are to be used to translate the effective address of the request to a real address, then processing continues with obtaining the VSID from the SLBE, STEP 810. The VSID is used to locate an entry in one type of table (e.g., the hash table) in order to obtain the root of another type of table (e.g., a hierarchical table, such as a radix table). In particular, in one example, the VSID is used to create a canonical address used to index into the HPT to obtain the RTABORG. A canonical address is an address created for a plurality of pages in a segment. That is, a particular segment includes a plurality of pages that share the same radix table. Therefore, the address used to index into HPT is to be the same for all those pages. In order to create the canonical address, the low order address bits for all the addresses that share the same radix table are zeroed out (and in one embodiment an appropriate constant is added). For instance, the virtual address obtained based on the effective address includes the VSID, and page and byte offsets. The VSID is used (optionally, along with the constant) to create the canonical address. The canonical address is used to index into the HPT to obtain the origin (i.e., the virtual real address of the first table in the hierarchy of tables) of the particular radix table to be used in translation.

A determination is made as to whether an HPT access event occurred for the canonical HPT entry address while trying to find the radix base address, INQUIRY 812. For instance, was there a miss in the HPT table in that the canonical address could not be located? If so, then a guest translation event is provided specifying the guest virtual address to be translated, STEP 814. For instance, an instruction storage interrupt (ISI) or data storage interrupt (DSI) depending on whether the translation that resulted in a fault corresponded to an instruction or data access is provided from the hardware to the operating system; i.e., the guest operating system. Optionally, a new exception type corresponding to a radix table root look-up miss is indicated. Thereafter, the operating system performs corrective action, including, for instance, reloading the radix base in the HPT using a hypervisor call, STEP 816. For instance, the hypervisor is called to load the missing information into the HPT. Additionally, the operating system restarts the memory instruction, STEP 818, and processing continues with STEP 800.

Returning to INQUIRY 812, if there was not an HPT access event for the canonical address, then translation continues with performing a walk of the radix table to obtain the guest physical address from the guest virtual address, STEP 819. The walk of the radix table uses the page and byte offsets of the effective address similar to the processing described with reference to FIG. 5B. Further, in one example, the translation from guest virtual address to guest physical address also includes using the HPT. That is, since the radix table is stored in a partition (i.e., a guest), it has addresses that correspond to addresses within a partition that are to be translated to real addresses. So, as the radix table is accessed, the HPT is used to translate those accesses to real addresses. This translation is described in further detail below.

Continuing with STEP 819, should a translation event occur based on a translation performed in STEP 819, then the event is handled. If it is a radix event, INQUIRY 820, then such event is indicated by using an ISI/DSI to provide an indication of the event (e.g., radix table miss) to the operating system, STEP 822. Further, the operating system reloads the translation to the radix table, STEP 824, and restarts the memory instruction, STEP 826. Processing continues at STEP 800.

Returning to INQUIRY 820, if an HPT event occurred, then a translation event is indicated via, for instance, a HISI/HDSI (hypervisor ISI/DSI) indicating the event, STEP 830. Further, the hypervisor reloads the HPT, STEP 832, and the hypervisor restarts the memory instruction, STEP 834. Processing returns to STEP 800.

Returning to INQUIRY 820, if there is not a translation event, then the guest physical address obtained from translating the radix table is translated to a host physical address using HPT, STEP 840. Again, if there is a translation event, INQUIRY 842, then processing continues with indicating the translation event at STEP 844. Otherwise, the memory access instruction is completed using the translated address, STEP 846.

Figure 8B:
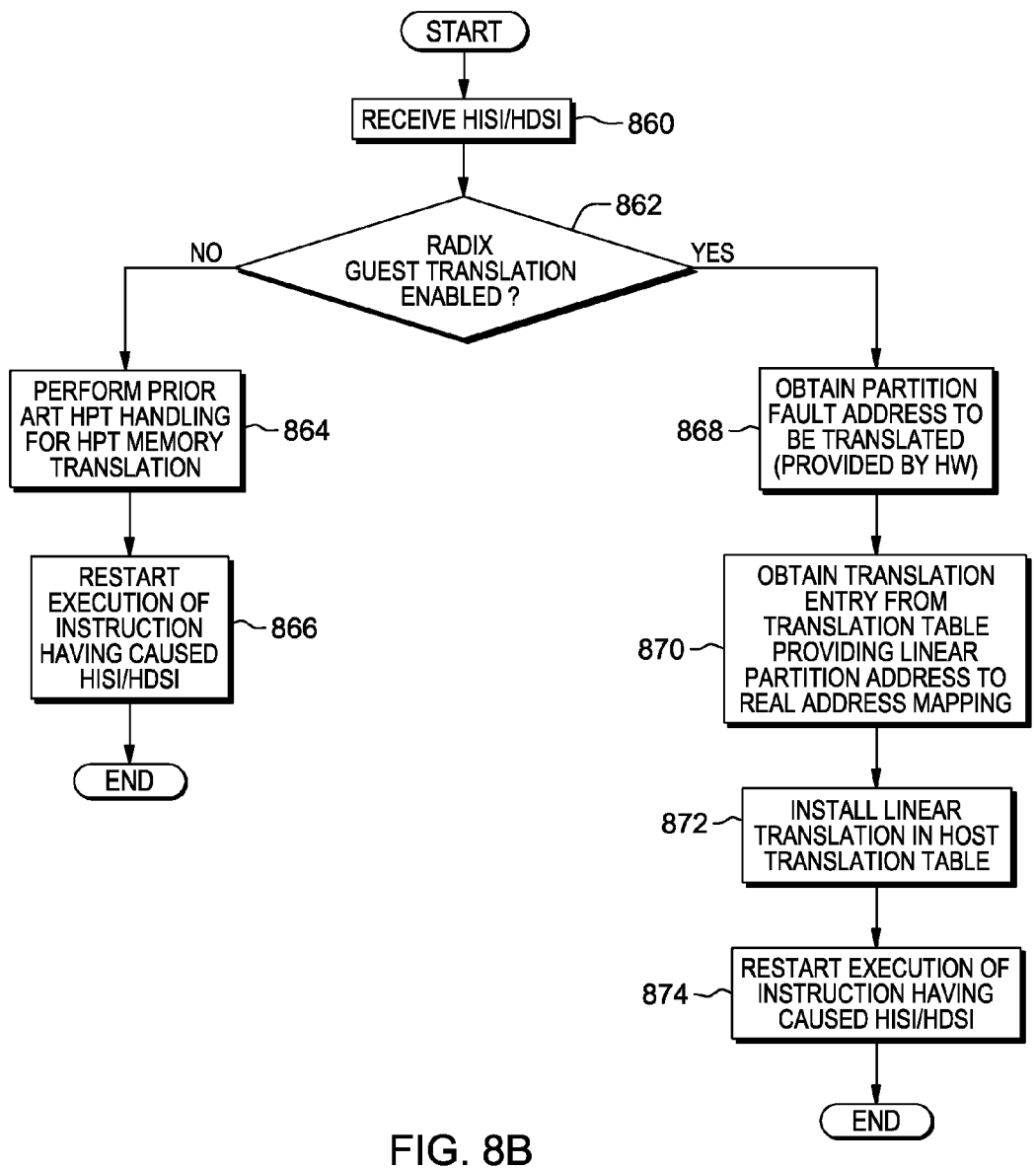
FIG. 8B depicts one embodiment of the logic performed by a hypervisor to handle a fault resulting from address translation.

Should the hypervisor be interrupted via an HISI or HDSI, the hypervisor performs certain processing, an example of which is depicted and described with reference to FIG. 8B. Initially, the hypervisor receives the HISI/HDSI, STEP 860. Thereafter, a determination is made as to whether radix guest translation is enabled, INQUIRY 862. In one example, this is determined by an indicator in a control register or other register. If radix guest translation is not enabled, then HPT event handling for HPT memory translation is performed as usual, STEP 864. For instance, the hypervisor reloads the HPT. Further, execution of the instruction that caused the HISI/HDSI is restarted, STEP 866.

Returning to INQUIRY 862, if radix guest translation is enabled, the partition fault address (e.g., the guest physical address) to be translated is obtained by the operating system from the hardware, STEP 868. Further, a translation entry for that address is obtained from a memory map to load the host translation table, STEP 870. The translation entry that is obtained is installed in the host translation table (e.g., HPT or radix, in a further embodiment), STEP 872, and execution of the instruction having caused the HISI/HDSI is restarted, STEP 874.

For example, in one embodiment, host translation is performed using an HPT structure. In accordance with this embodiment, further to STEP 868, a translation entry for that address is obtained from a memory map to load the HPT, STEP 870. In accordance with another embodiment and in another execution, a host physical page has been paged out and is paged in prior to installing a translation entry. The translation entry that is obtained is installed in the HPT, STEP 872, and execution of the instruction having caused the HISI/HDSI is restarted, STEP 874. In another embodiment, host translation is performed by a radix structure. In accordance with this embodiment, further to STEP 868, a translation fault is handled for a radix table, e.g., a translation entry for that address is obtained from a memory map to load the radix table, STEP 870. In accordance with another embodiment and in another execution, a host physical page has been paged out and is paged in prior to installing a translation entry. The translation entry that is obtained is installed in the radix table, STEP 872, and execution of the instruction having caused the HISI/HDSI is restarted, STEP 874.

Figure 9:
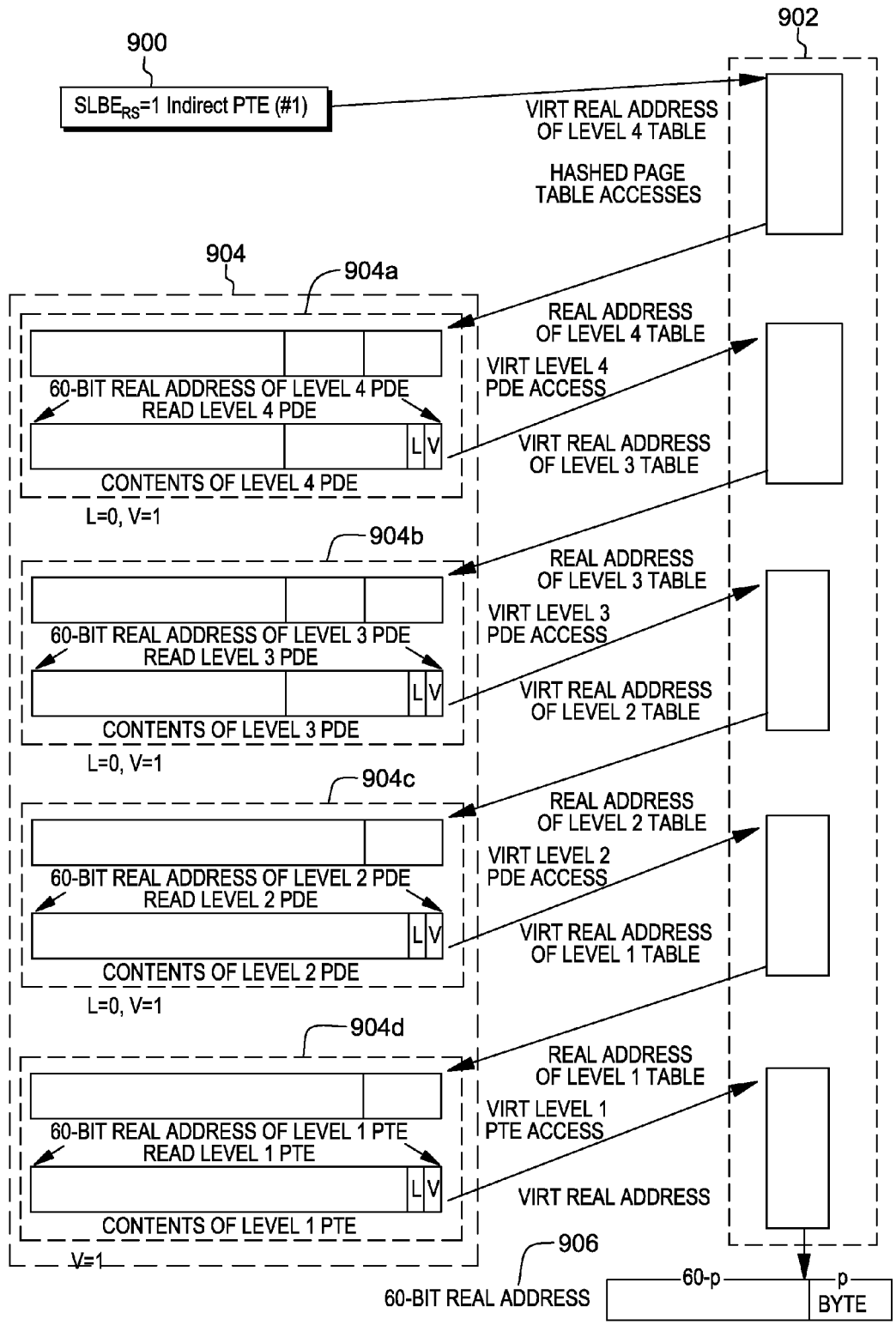
FIG. 9 depicts one example of a radix on hash page table search.

Returning to FIG. 8A, as indicated in STEP 819, at times, when using the radix table for translation, the HPT is also used to translate addresses corresponding to the radix table accesses. One embodiment of this logic is described with reference to FIG. 9. Initially, if the RS field of the SLBE associated with the received address to be translated is one (900), then a HPT 902 is to be accessed to obtain an indirect PTE. For example, a canonical address is generated and used to access the HPT to find the base virtual real address of a radix translation structure 904 or other hierarchical translation structure. That virtual real address is then input into HPT 902 to obtain a real address of radix translation structure 904. Radix translation structure 904 includes a plurality of radix translation structures, including, for instance, a level 4 page directory (PD) 904a, a level 3 PD 904b, a level 2 PD 904c, and a level 1 page table (PT) 904d, and in this case, the real address of level 4 structure 904a, referred to as a level 4 page directory (PD), is obtained from HPT 902. Each page directory and page table has a plurality of page directory entries (PDEs) or page table entries (PTEs), respectively.

Then, the first X (e.g., 9) bits of the effective address to be translated are used to index into PD 904a to obtain the pertinent contents. The contents of the selected level 4 page directory entry are checked to see if there are additional levels to be searched (e.g., is L=0), and if so, the guest virtual address of PD 904b obtained from the selected PDE of PD 904a is used to hash into HPT 902. Based thereon, the real address of a level 3 PD structure 904b is obtained. The next X bits of the effective address are used to index into PD 904b and this access provides a virtual real address of a level 2 structure 904c. This virtual address is used in hash structure 902 to obtain a real address of structure 904c. The next X bits of the effective address are used to index into PD 904c to obtain a virtual real address of level 1 PT 904d, which is used to access the HPT. The output of the HPT access is the real address of a level 1 table 904d, which is used to obtain another virtual real address. Since implicitly L=1 as all levels in the page table have been exhausted, this is the last table of the radix structure, and therefore, this entry is the page table entry. The next X bits of the effective address are used to index into the page table to provide the guest physical address. The guest physical address is used to access the hash table. The output of the hash table combined with a byte offset of the effective address provides the host physical address 906 corresponding to the effective address being translated.

Described in detail above are aspects in which multiple types of translation structures are used to translate a particular address from one format (e.g., an effective address) to another format (e.g., a real address). However, if the system configuration does not support such a feature or if it supports that feature, as well as legacy translation techniques, then legacy translation is provided.

Figure 10:
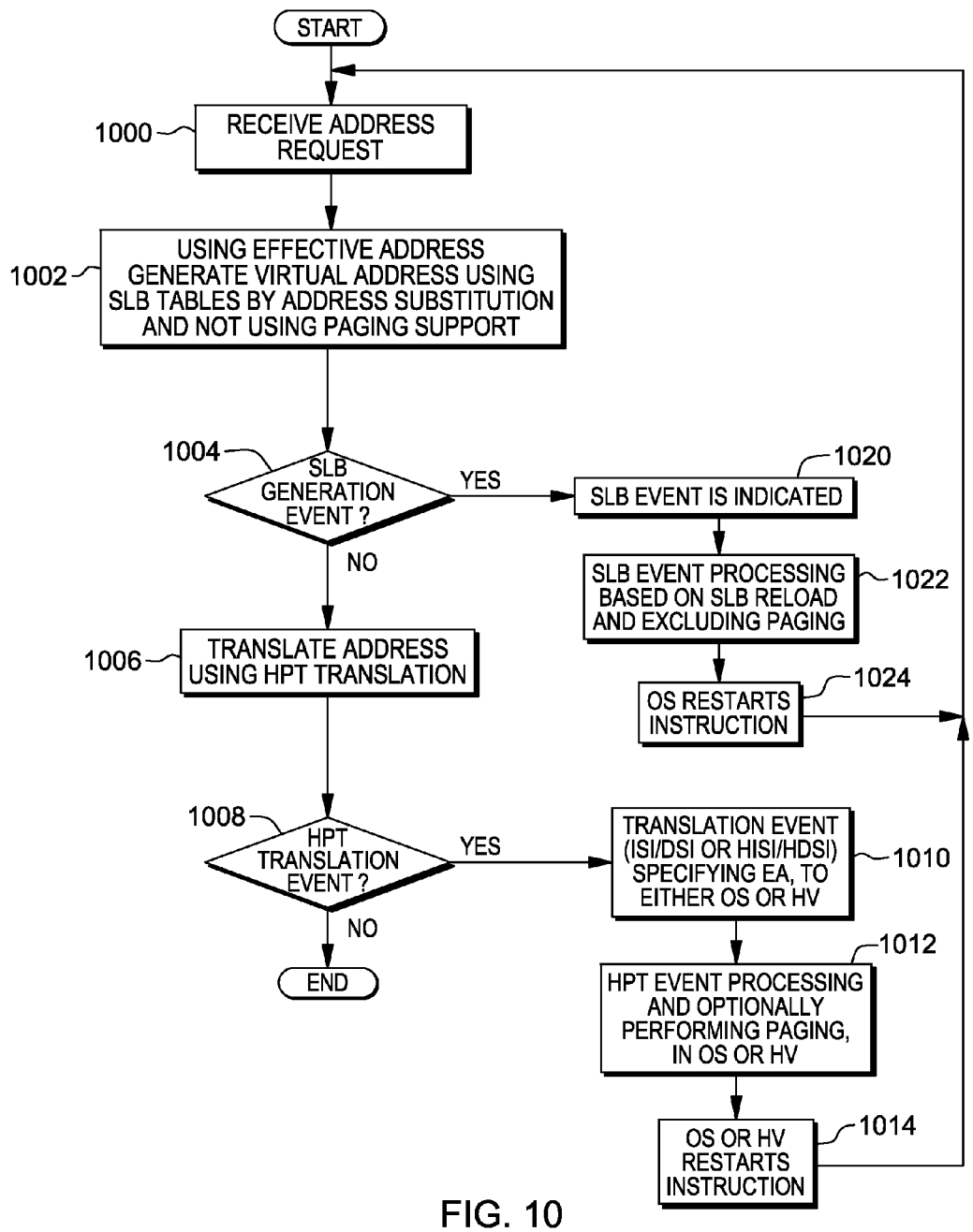
FIG. 10 depicts one example of a hash page table translation mechanism.

One embodiment of the logic of a legacy translation technique in which a hash page table is used is described with reference to FIG. 10. Initially, an address request is received that includes an effective address, STEP 1000. The effective address is used to generate a virtual address, STEP 1002. For instance, the ESID is used to locate an SLBE, which includes a VSID. The VSID combined with the page.byte of the effective address provides the virtual address to be translated. Thus, the virtual address is created by address substitution (referred to herein as segmentation) and not using paging support. Thereafter, a determination is made as to whether there is an SLB address generation event, INQUIRY 1004. For instance, was there a miss in the SLB when looking for the ESID? If not, then the virtual address is translated to a real address using conventional HPT translation, STEP 1006. A determination is made as to whether there is a translation event, INQUIRY 1008. If there is no HPT translation event, then processing is complete, and the real address can be used to access memory.

Returning to INQUIRY 1008, if there is an HPT translation event, then the translation event is specified to either the operating system or hypervisor using, for instance, ISI/DSI or HISI/HDSI, STEP 1010. HPT event processing is performed, including optionally performing paging, STEP 1012. The operating system or hypervisor restarts the instruction, STEP 1014, and the flow returns to STEP 1000.

Returning to INQUIRY 1004, if there is an SLB generation event, then an SLB event is indicated to the operating system, STEP 1020. Further, SLB event processing is performed including, for instance, reloading the SLB (excluding paging), STEP 1022. The operating system restarts the instruction, STEP 1024, and processing continues with STEP 1000.

Figure 11:
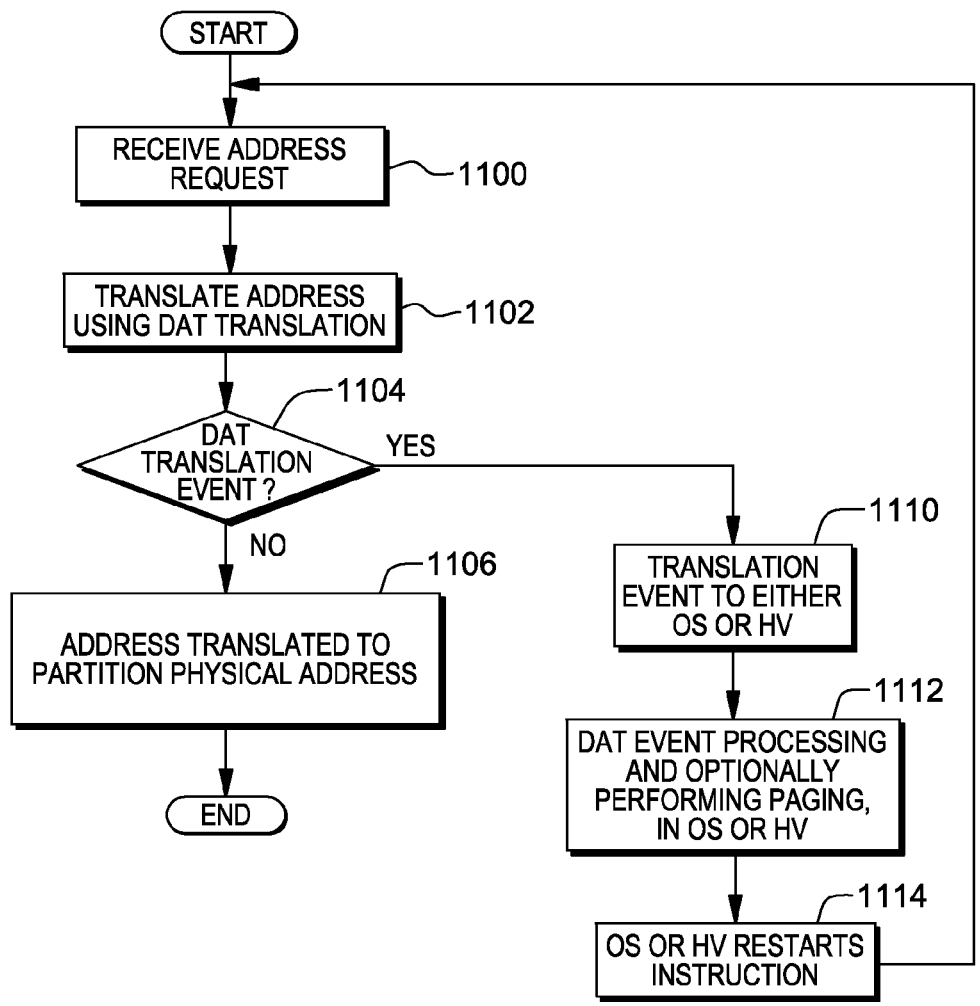
FIG. 11 depicts one example of a dynamic address translation (DAT) mechanism.

A further legacy technique for translating memory addresses is described with reference to FIG. 11. This technique uses a hierarchical translation mechanism. Initially, an address request is received, STEP 1100. The address is translated using, for instance, DAT translation, STEP 1102, which is similar to the hierarchical translation described herein. One example of an architecture that uses DAT translation is the z/Architecture, which is described in an IBM Publication entitled "z/Architecture—Principles of Operation," Publication No. SA22-7932-08, $9^{th}$ Edition, August 2010, which is hereby incorporated herein by reference in its entirety. Thereafter, a determination is made as to whether there was a DAT translation event, such as a miss, INQUIRY 1104. If not, then the address has been translated to a physical address, STEP 1106, and processing is complete.

However, if there is a DAT translation event, INQUIRY 1104, then the translation event is either indicated to the operating system or hypervisor, STEP 1110. DAT event processing is performed in the operating system or hypervisor; optionally, performing paging, STEP 1112. Further, the operating system or the hypervisor restarts the instruction, STEP 1114, and processing continues to STEP 1100.

Described in detail above is a capability for using multiple types of paging data structures to translate an effective address to a real address. One type of structure is accessed to obtain an origin of another type of structure. Then, the other type of structure, and optionally, the one type of structure are used to translate the address.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 12:
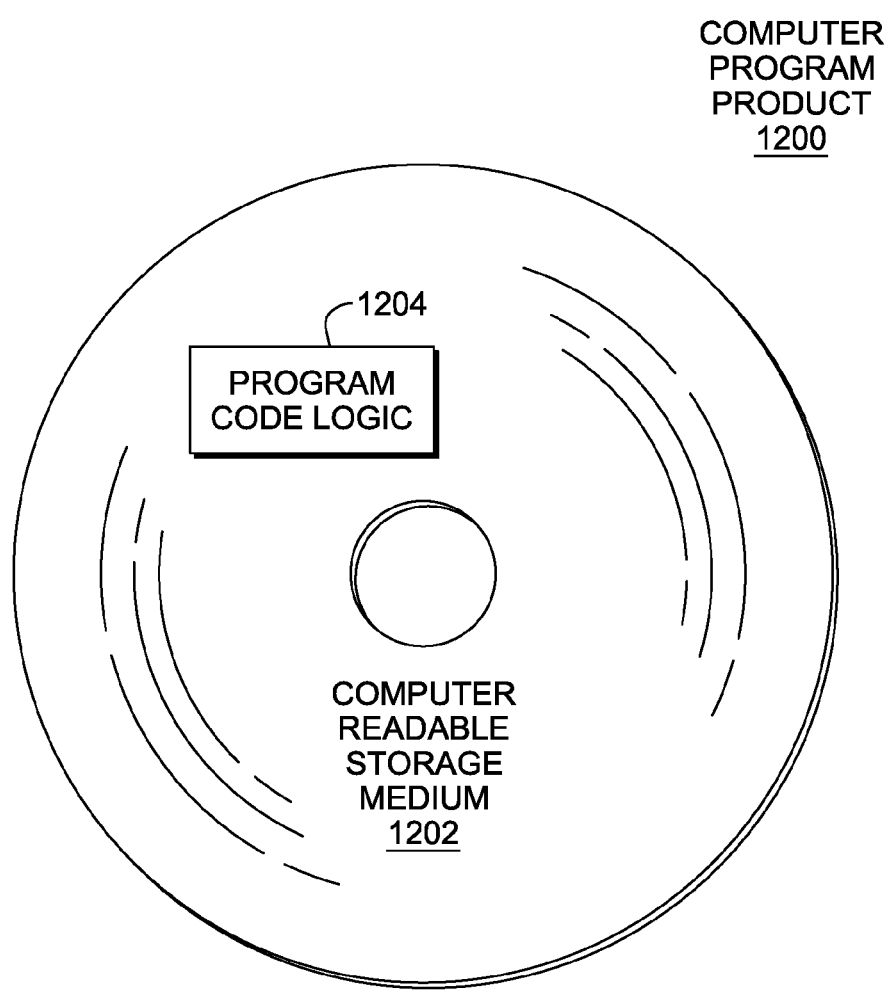
FIG. 12 depicts one embodiment of a computer program product incorporating one or more aspects.

Referring now to FIG. 12, in one example, a computer program product 1200 includes, for instance, one or more non-transitory computer readable storage media 1202 to store computer readable program code means or logic 1204 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects of the present invention. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects of the present invention.

As yet a further aspect, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of translation structures may be used and other types of environments may benefit from one or more aspects. Additionally, each structure may have different fields and/or the fields can be of different sizes. Moreover, the number of bits used to index into a structure may be the same or different for each level, and/or for each structure. Further, in another embodiment, a different type of structure (e.g., a hierarchical structure or other structure) may be used to find the base origin (i.e., virtual real address) of another structure (e.g., a hash structure or other structure). Other possibilities exist. Many variations are possible.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain various aspects and the practical application, and to enable others of ordinary skill in the art to understand the various embodiments with various modifications as are suited to the particular use contemplated.

What is claimed is:

1. A computer program product for facilitating translation of memory addresses, said computer program product comprising:
   a non-transitory computer readable storage medium readable by a processing circuit and storing instructions for execution by the processing circuit for performing a method comprising:
      determining, by a processor, whether a first address translation structure of a first type is to be used to translate a memory address, the first address translation structure being a data structure to be used to translate memory addresses;

based on the determining that a first address translation structure of the first type is to be used, accessing a second address translation structure of a second type, and utilizing the second address translation structure to determine a particular first address translation structure to be used to translate the memory address, and to obtain an origin address of that particular first address translation structure, wherein the second address translation structure is a data structure to be used to translate memory addresses, wherein the second type is different from the first type, and wherein one of the first type or the second type comprises a hierarchical data structure; and using the particular first address translation structure in translating the memory address.

2. The computer program product of claim 1, wherein the determining comprises checking an indicator to determine whether the first address translation structure is to be used, the indicator located in an entry of a data structure located using a portion of the memory address to be translated.

3. The computer program product of claim 2, wherein the indicator is located in a segment lookaside buffer entry (SLBE), the SLBE located using an effective segment identifier field of the memory address.

4. The computer program product of claim 3, wherein the SLBE includes a virtual segment identifier (VSID) field, and wherein the accessing the second address translation structure comprises using the VSID to locate an entry in the second address translation structure that includes the origin address.

5. The computer program product of claim 1, wherein the memory address is related to a guest virtual address, and the using comprises using the particular first address translation structure to translate the guest virtual address to a guest physical address.

6. The computer program product of claim 5, wherein the using further comprises using the second address translation structure to translate the guest virtual address to the guest physical address.

7. The computer program product of claim 5, further comprising translating the guest physical address to a host physical address, the host physical address to be used for a memory access, and wherein the translating uses the second address translation structure.

8. The computer program product of claim 1, wherein the using comprises using the particular first address translation structure to translate the memory address to an address to be used to directly access memory.

9. The computer program product of claim 1, further comprising: determining that a fault occurred during the accessing or the using; and presenting an indication of the fault to one of an operating system or a hypervisor.

10. The computer program product of claim 1, wherein the first address translation structure comprises a hierarchical translation structure and the second address translation structure comprises a hash translation structure.

11. A computer system for facilitating translation of memory addresses, said computer system comprising:
a memory; and
a processor in communications with the memory, wherein the computer system is configured to perform a method, said method comprising:

determining whether a first address translation structure of a first type is to be used to translate a memory address, the first address translation structure being a data structure to be used to translate memory addresses;

based on the determining that a first address translation structure of the first type is to be used, accessing a second address translation structure of a second type, and utilizing the second address translation structure to determine a particular first address translation structure to be used to translate the memory address, and to obtain an origin address of that particular first address translation structure, wherein the second address translation structure is a data structure to be used to translate memory addresses, wherein the second type is different from the first type, and wherein one of the first type or the second type comprises a hierarchical data structure; and using the particular first address translation structure in translating the memory address.

12. The computer system of claim 11, wherein the determining comprises checking an indicator to determine whether the first address translation structure is to be used, the indicator located in an entry of a data structure located using a portion of the memory address to be translated.

13. The computer system of claim 12, wherein the indicator is located in a segment lookaside buffer entry (SLBE), the SLBE located using an effective segment identifier field of the memory address, and the SLBE including a virtual segment identifier (VSID) field, and wherein the accessing the second address translation structure comprises using the VSID to locate an entry in the second address translation structure that includes the origin address.

14. The computer system of claim 11, wherein the memory address is related to a guest virtual address, and the using comprises using the particular first address translation structure to translate the guest virtual address to a guest physical address.

15. The computer system of claim 14, wherein the using further comprises using the second address translation structure to translate the guest virtual address to the guest physical address.

16. The computer system of claim 14, wherein the method further comprises translating the guest physical address to a host physical address, the host physical address to be used for a memory access, and wherein the translating uses the second address translation structure.

17. The computer program product of claim 11, wherein the method further comprises:
determining that a fault occurred during the accessing or the using; and
presenting an indication of the fault to one of an operating system or a hypervisor.

\* \* \* \* \*